J. R. GAMMETER.
APPARATUS FOR VULCANIZING.
APPLICATION FILED APR. 22, 1908.
913,720.
Patented Mar. 2, 1909.
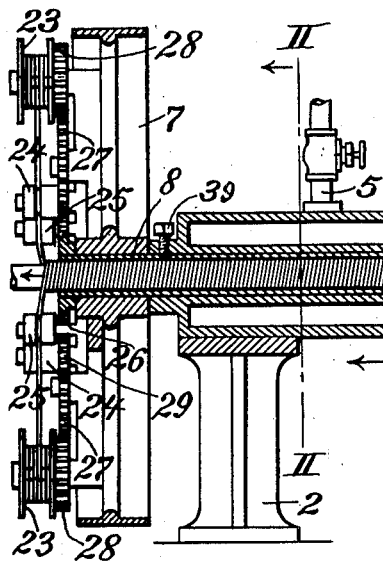

UNITED STATES PATENT OFFICE.

JOHN R. GAMMETER, OF AKRON, OHIO, ASSIGNOR TO B. F. GOODRICH COMPANY, OF AKRON, OHIO, A CORPORATION OF OHIO.

APPARATUS FOR VULCANIZING.

No. 913,720.     Specification of Letters Patent.     Patented March 2, 1909.

Application filed April 22, 1908. Serial No. 428,483.

*To all whom it may concern:*

Be it known that I, JOHN R. GAMMETER, a citizen of the United States, and a resident of the city of Akron, county of Summit, and State of Ohio, have invented certain new and useful Improvements in Apparatus for Vulcanizing, of which the following is a specification.

In my application for improvements in the art of vulcanizing filed June 20, 1907, Serial No. 379,831, I have described and claimed a novel method of vulcanizing rubber articles of great length as a continuous process, and in my application for apparatus for vulcanizing, Serial No. 374,686, filed May 20, 1907, I have described and claimed an apparatus adapted to vulcanize rubber articles in such a way.

My present invention relates to devices or apparatus of different form designed to accomplish the same general results.

Before my inventions, the usual modes of vulcanizing hose, solid rubber tires, belting or other articles of elongated form, was to either vulcanize the articles in straight molds of such length as could be easily handled, in which case the lengths produced were necessarily quite limited, or in the case of small hose or tubing, to vulcanize it in coiled form. The latter method, however, has the objection that the tubing is given a permanent curve or set by being vulcanized while coiled, which makes the hose, when in use, inconvenient to handle and of diminished durability.

In the accompanying drawing forming part of this specification, Figure 1 is a longitudinal vertical section through a vulcanizing machine embodying my invention. Fig. 2 is a transverse section of the machine on the line II—II of Fig. 1. Fig. 3 is an end elevation of the machine looking at the winding end thereof. Fig. 4 is a transverse section, and Fig. 5, a longitudinal section through the coiling die; Fig. 4 being taken upon the line IV—IV of Fig. 5, and showing the hose in section, and Fig. 5 being taken on line V—V of Fig. 4, showing a portion of the guide tube with the fixed gear attached thereto, and showing a portion of the hose and mold in elevation. Fig. 6 is a view similar to Fig. 5 of a slightly modified construction, the hose and mold being omitted. Fig. 7 is a view similar to Fig. 5 of another modified form.

Referring to the drawings in detail, 1 is a vulcanizer supported on pedestal 2 and provided with a central longitudinal chamber or channel 3 through which preferably extends a guide tube 4. This guide tube may, however, be dispensed with and the interior surface of the chamber be itself used as a guide tube. The vulcanizer is preferably divided longitudinally into two sections, which may be separated to permit the introduction or removal of the guide tube. In the preferred embodiment of my invention, each of these sections is made hollow and provided with suitable means, as a pipe 5 for the introduction of steam thereto to serve as a heating medium. Any other arrangment for heating the chamber or guide tube may, however, be resorted to. The hose 40, or other article to be vulcanized, is designed to be passed through the chamber in the vulcanizer continuously or substantially continuously, and at such a rate that it will be subjected to heat for a sufficient length of time to properly vulcanize it, so that upon its exit from the chamber it will be in a finished state.

For the purpose of supporting and molding the uncured hose and for feeding it through the heating chamber, I spirally wind upon the hose just before it enters the chamber one or more bands which may be either round or flat wires, or strips of other suitable material. These wires being wound closely and compactly about the hose, form a casing or mold therefor. They completely incase the hose during its passage through the heating chamber, and upon its emergence therefrom, may be unwound, leaving the hose fully vulcanized and needing no further support. I have devised a particular machine for the purpose of winding these wires about the hose and unwinding them therefrom, though it is perfectly possible to use the wires in the way which I have described without this apparatus, as the wires may be wound by other devices or by hand. In this apparatus, I provide a winding pulley 6 at the entrance to the vulcanizing chamber and an unwinding pulley 7 at its exit. These pulleys are driven by belts about their peripheries, or in other suitable manner, and are mounted concentrically with the axis of the channel through the vulcanizer upon hollow journals so that the hose may be passed through the journals and through the vulcanizing chamber. Where I use a separate guide tube in the chamber, I prefer to extend this at each end beyond the chamber, as at 8, 8, to form these journals. The winding pulley carries one or more spools or reels 9 from which the wires forming the mold are drawn. These reels are preferably provided with some frictional tension device, such as the springs 10 pressing upon washers to prevent them from running too fast, and allowing the wire to become tangled. To cause the wire to take the proper coiled formation without cutting the soft uncured rubber of the hose, I preferably pass it through a coiling die 11, which surrounds the hose. This coiling die 11 is shown most clearly in Figs. 4 and 5, and consists of a sleeve carried by fingers 12, which project from the spokes or other portions of the winding pulley. These fingers preferably unite at their inner ends in a ring 13, which may be threaded on the inside and into which a portion of the coiling die 11 screws. Any other means of attaching the die to the fingers may be used, or the separate die may be entirely dispensed with and the ring 13 itself be shaped to form a die. I prefer, however, the separate die as shown, as a new one may then be inserted to replace one which has become worn. The coiling die or sleeve is formed with a tapered mouth 14 adapted to guide the entering hose and with an enlarged and internally threaded portion 15, which receives the winding wires 16, and causes them to coil into spiral form. The wires enter the die through suitable apertures 38. For the purpose of feeding the wires from the reels or spools 9 through the apertures 38, and for forcing them to assume the coiled formation and to lie close to the screw threaded inner surface of the die, I provide a pair of rolls 18 and 19 carried by a suitable part of the winding pulley, as a web 37, which grip the wire frictionally. One of these rolls 18 is positively driven by a gear 20 which meshes with a fixed gear 21, preferably carried upon the end of the journal 8 projecting beyond the winding pulley, and secured thereto by set screws 22, or in any other suitable manner. The wire is sufficiently stiff to be forced or pushed by the feeding rolls into the coiling die and coiled therein. The feeding rolls are driven at a slightly greater peripheral speed than that at which the wire is taken up by the hose, whereby they tend to feed or push the wire forward into the die, but they are adjusted so that they will nor positively grip the wire, but will slip upon the same before the wire will buckle. In order to enable the wire to sustain the pressure necessary to force it into the die, the feeding rolls may be placed close to the apertures in the die, so as to leave as short a length as possible of the portion of the wire under compression, unsupported. Where a little space separates the rolls and the die, as in the form shown in the drawings, the requisite lateral support may be obtained by providing the die with tubular extensions 17. The coiling die 11 also serves the purpose of feeding the incased hose through the vulcanizing chamber, for as it revolves with the winding pulley, its threaded portion 15 acts as a revolving nut upon the coiled wires 16 surrounding the hose and screws, or feeds the hose forward. The hose is preferably inflated before being passed through the machine to give it more rigidity, and to cause it to expand tightly within the wire winding. The walls of the hose are thus subjected to compression which causes the layers of rubber and fabric to properly adhere.

I usually make the tubing of a little larger diameter than the size which I intend to give it when vulcanized, and then reduce it to its final size by winding it tightly with the wires or bands. This produces a more compact product. The increase in diameter due to the inflation, may be sufficient without actually making a larger diameter.

The unwinding mechanism is practically the reverse of the winding. The pulley 7 is provided with reels or spools 23 for receiving the unwound wire which is fed to them between rolls 24 and 25. A fixed gear 26 similar to the gear 21 is mounted upon the projecting end of the journal 8, or in any other suitable manner, and with it meshes a gear 27 journaled upon the unwinding pulley, which in turn meshes with a gear 28, which drives the spool or reel 23, and also with a gear 29 which drives the roll 24. No die is necessary at the unwinding end of the device, but the wires pass directly from the hose through the feed rolls and to the positively driven reels.

In Fig. 6, I have shown a slightly modified construction of the die-holding ring and die, the ring being marked 30 and the die 31. In this case the wire passes through an aperture 32 extending through both the ring and the die. No extensions are necessary as the parts of the apertures 32 in the ring 30 take their place.

Fig. 7 shows a die 33 constructed to coil flat bands 35 around the hose in place of the round wires. The operation is substantially the same, the bore of the die, however, not being threaded, but being provided with a cylindrical enlargement 36 to hold the coils. The end wall of this enlargement forms an abutment 34 against which the bands 35 react to force the hose and casing forward. There is a sort of screw action between the last coil of the bands forming the casing and the abutment. A similar die to this might be used with the round wires, that is, the screw threaded portion 15 is not necessary in the forms of Figs. 5 and 6, as long as the dies are formed with the abutments 34.

In operation the hose 40 is fed into the machine from a storage reel not shown, or the machine may be placed adjacent to the tubing machine from which the hose may be fed directly into the vulcanizer. As the hose advances through the revolving coiling die, the wires are rapidly and evenly coiled about the same, and owing to the inflation of the hose, tightly grip it. The revolving coiling die through the screw action above described causes the coils of wire and the hose to slowly advance through the vulcanizing chamber at a speed so proportioned to the length and temperature of the chamber that complete vulcanization of the hose will have taken place when it reaches the exit. As the hose emerges, the wires are unwound by the unwinding device, and the hose in finished state, is reeled up ready for shipment. The spools or reels 9 are of such size as to hold a very considerable quantity of wire so that the machine may be run for a long time without the necessity of changing spools. The spools 23 may be made interchangeable with the spools 9, so that when the wire is entirely reeled thereon, they may be placed on the winding pulley, though usually, I find it more desirable to reel the wire from the spools 23 through a straightening device and on to spools 9. The apparatus for doing this, however, forms no part of my present invention, and I have not, therefore, shown or described it herein. It will be seen that as the pulleys 6 and 7 revolve, the gears 20 and 27 carried thereby which mesh with the gears 21 and 26, respectively, fixed to the ends of the guide tube 4, which in turn is secured from revolving, in any suitable manner as by the set screws 39, will be positively driven for the purposes already set forth. The inner diameter of the guide tube 4 should be of sufficient size to permit the incased hose to freely pass therethrough. In fact, there need be no guide tube throughout the length of the chamber as long as some suitable means of supporting the incased hose, is provided.

I have chosen for purposes of illustration merely one of the many modifications of which my invention is susceptible, for it is clear that apparatus of many different types may be constructed embodying my invention.

Forms of dies other than those shown in Figs. 5, 6 and 7 may be used, and in some cases, it may not be necessary to use a die of any form. I have shown apparatus for winding the hose with two bands, but I may in some cases use, one, three or more bands as found desirable, varying the number of spools and feeding rolls to suit. The hose may be fed through the vulcanizing chamber by other means than those described.

While I have described my invention with special reference to vulcanizing hose, it is not limited thereto and may be adapted to the manufacture of other articles of elongated form.

Having thus described my invention, I claim:

1. In vulcanizing apparatus, a vulcanizer and means for simultaneously winding a band about the article to be vulcanized, and feeding the wound portions of the article through the vulcanizer.

2. In vulcanizing apparatus, a vulcanizer having a passageway therethrough for the article to be vulcanized, and means for winding a band spirally about the article to be vulcanized as it enters the vulcanizer.

3. In vulcanizing apparatus, in combination, an elongated vulcanizing chamber, means for spirally wrapping a band about the article to be vulcanized at the entrance to said chamber and means for unwrapping said band at its exit.

4. In vulcanizing apparatus in combination, a vulcanizer and means including a coiling die for simultaneously winding a band about the article to be vulcanized, and feeding the wound portion of the article through the vulcanizer.

5. In vulcanizing apparatus, in combination, a vulcanizer having a passageway therethrough for the article to be vulcanized, a winding pulley, a hollow journal for the pulley concentric with the axis of said passageway and forming a continuation thereof, and a supply of wrapping material carried by said pulley.

6. In vulcanizing apparatus, in combination, a vulcanizer having a passageway therethrough for the article to be vulcanized, a winding pulley, a hollow journal for the pulley, a supply of wire carried by the pulley and a coiling die carried by the pulley adapted to coil the wire about the article to be vulcanized.

7. In vulcanizing apparatus, in combination, a vulcanizer, a passageway therethrough for the article to be vulcanized, a winding pulley adapted to revolve about an axis concentric with that of the passageway, a reel carried by the pulley, a wire carried by the reel, a coiling die carried by the pulley and adapted to coil the wire about the article to be vulcanized, and feeding means carried by the pulley to feed the wire from the reel into the coiling die.

8. In vulcanizing apparatus, in combination, a vulcanizer having a passageway therethrough for the article to be vulcanized, and means at the discharge end of said passageway for unwinding a band from the article.

9. In vulcanizing apparatus, in combination, a vulcanizer having a passageway therethrough for the article to be vulcanized, an unwinding pulley mounted to revolve about an axis concentric with that of the passageway, a reel carried by the unwinding pulley and mechanism for positively revolving said reel when the unwinding pulley is revolved.

10. In vulcanizing apparatus, in combination, a vulcanizer having a passageway therethrough for the article to be vulcanized, a hollow journal projecting from each end of said vulcanizer and forming an extension of said passageway, a winding pulley mounted upon one of said journals, a reel carried by said winding pulley, a positively driven feed roll carried by said pulley, a coiling die carried by said pulley, an unwinding pulley mounted upon the other journal, a positively driven reel, and a positively driven feed roll carried by said unwinding pulley, and a band wound about the reel on the winding pulley passing over the feed roll on the winding pulley through the coiling die and in the form of a coil throughout the vulcanizing chamber, over the feed roll on the unwinding pulley, and being wound about the reel on the unwinding pulley.

11. In vulcanizing apparatus, in combination, a vulcanizer and a guide tube passing therethrough and projecting therefrom at each end, a winding pulley mounted upon one of said projecting ends, and an unwinding pulley mounted upon the other.

12. In vulcanizing apparatus, in combination, a vulcanizer having a passageway therethrough, a hollow journal projecting from one end of said chamber and forming a continuation of said passageway, a pulley mounted upon said journal, a gear fixed to the outer end of said journal and a gear carried by said pulley in mesh with said fixed gear.

13. In vulcanizing apparatus, in combination, a vulcanizer having a passageway therethrough, a pulley mounted to revolve about an axis concentric with that of the passageway, at the entrance end of said chamber, a reel carried by said pulley, and a device for retarding the free revolution of said reel.

14. In vulcanizing apparatus, a vulcanizer, a passageway therethrough for the article to be vulcanized, means for spirally winding a band about the article to be vulcanized, and an abutment immovable in the direction of travel of the article, to react against the band.

15. In vulcanizing apparatus, a vulcanizer, a passageway therethrough for the article to be vulcanized, a winding pulley for winding a band about the article to be vulcanized, a finger carried by the pulley, and an abutment carried by the finger.

16. In vulcanizing apparatus in combination, a vulcanizer, a passageway therethrough for the article to be vulcanized, a winding pulley for winding a band about the article to be vulcanized, said pulley being provided with a plurality of fingers projecting therefrom and converging, the ends of said fingers uniting in a ring concentric with the axis of said pulley, and a coiling die secured to said ring.

JOHN R. GAMMETER.

Witnesses:
JAMES D. TEW,
WALTER T. MEANS.